March 10, 1959  A. B. BLACKBURN ET AL  2,876,847
AIR DRIVEN PROPELLER AND GOVERNOR THEREFOR
Filed April 1, 1954  2 Sheets-Sheet 1

INVENTORS
Alan B. Blackburn
James R. Kessler
Robert K. Skinner
John H. Smith
BY Craig V. Morton
Their Attorney March 10, 1959 — A. B. BLACKBURN ET AL — 2,876,847
AIR DRIVEN PROPELLER AND GOVERNOR THEREFOR
Filed April 1, 1954 — 2 Sheets-Sheet 2
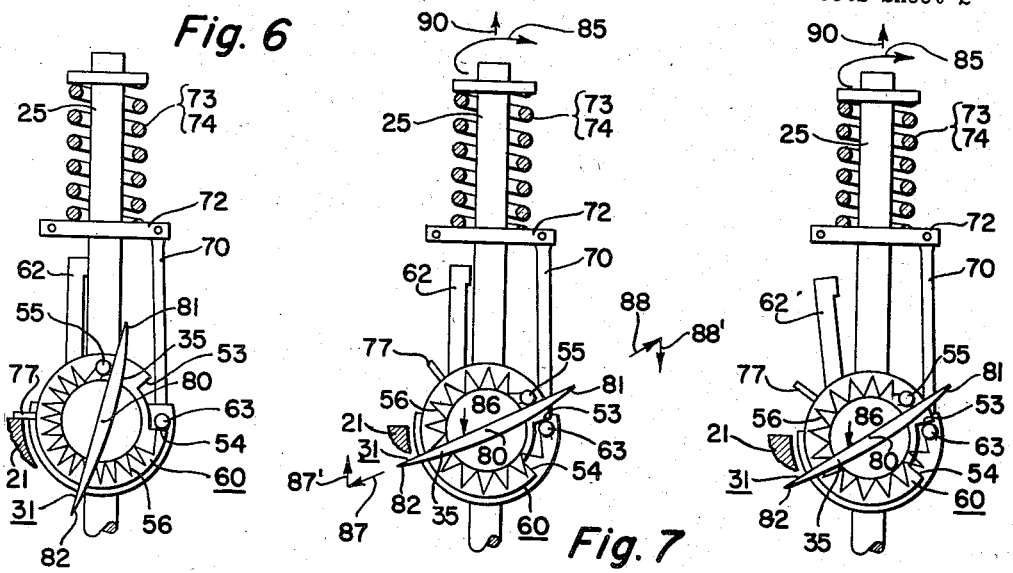
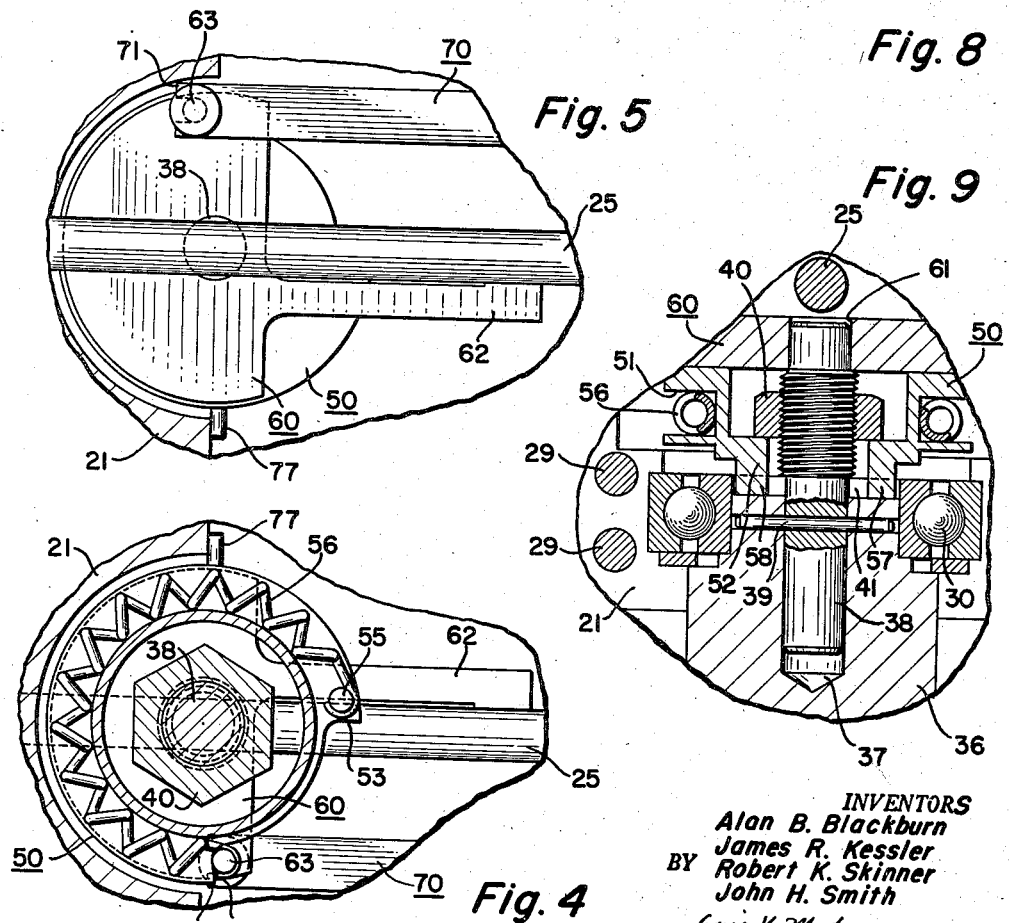
INVENTORS
Alan B. Blackburn
James R. Kessler
Robert K. Skinner
John H. Smith
BY Craig V. Morton
Their Attorney United States Patent Office 2,876,847
Patented Mar. 10, 1959

2,876,847

AIR DRIVEN PROPELLER AND GOVERNOR THEREFOR

Alan B. Blackburn, Covington, James R. Kessler, Troy, and Robert K. Skinner and John H. Smith, Dayton, Ohio, assignors to General Motors Corporation, Detroit, Mich., a corporation of Delaware Application April 1, 1954, Serial No. 420,278

9 Claims. (Cl. 170—68)

This invention pertains to an air driven propeller, and particularly to an air driven propeller for operating emergency aircraft equipment.

Heretofore, air driven propellers have been used on aircraft for driving various accessories. However, in prior art devices, the governing means were not designed to control propeller speed in an air stream having velocities varying between 150 and 600 knots. At the present time, there is a demand for governing air driven propellers for operating emergency aircraft equipment, such as generators and pumps. Accordingly, among our objects are the provision of a variable pitch air driven propeller including governing means for maintaining propeller speed within predetermined limits in air streams of widely varying velocities; the further provision of an air driven propeller having means for positioning the blades at a high pitch angle, or angle of incidence, when the propeller is stationary; and the still further provision of an air driven propeller including mechanical means for adjusting the pitch of the blades.

The aforementioned and other objects are accomplished in the present invention by incorporating a governor which is operable to maintain propeller speed within predetermined limits by establishing an equilibrium between the opposing forces tending to alter the pitch position, or incidence angle, of the blades within the operating speed range. Specifically, the propeller includes a hub within which a pair of blades are journaled for rotation about their longitudinal axes. The hub is connected to and supported by a rotatable shaft which is drivingly connected within an emergency accessory, such as a pump or generator. The hub and root sections of the propeller blades are enclosed by a rotatable spinner, which also encloses the mechanical governor and pitch adjusting means.

The governor includes a pair of centrifugally responsive flyweights, each flyweight being rotatably supported in the hub and operatively connected to its respective blade for adjusting the pitch position thereof. A retainer, comprising a substantially cup-shaped member, is attached to the root section of each blade. Each retainer is formed with an annular groove having a segment of one groove wall relieved so as to form a pair of shoulders or abutments. A coiled extension spring is situated in the groove, one end of the spring being attached to a pin carried by the retainer, and the other end of the spring being attached to a pin carried by the flyweight. Each spring performs two functions, namely, to rotate its respective propeller blade to a high pitch, or incidence angle, when the propeller is stationary, and to control the rate of "unfeathering" after the unit is extended into the air stream.

The flyweights are pivotally connected to a pair of connecting rods or links which serve a dual function, namely, to synchronize movement of the two blades, and to transmit a spring force to the flyweights which opposes movement thereof in response to centrifugal force. The links are also pivotally connected to a reciprocable collar which is slidably supported on the propeller shaft. The collar is biased by a governor spring assembly so as to oppose movement of the flyweights, the arrangement of the governor being such that at any of the preselected speeds of propeller rotation within the governing range, the opposing forces acting on the blades will be in equilibrium, thereby maintaining the pitch, or incidence, angle thereof constant. Generally speaking, if the propeller overspeeds, the centrifugal force acting on the flyweights will overcome the governor spring force, thereby permitting the flyweights to move outwardly to increase the incidence, or pitch, angle of the blades, thereby tending to cause propeller speed to decrease. Conversely, if the propeller should underspeed, the governor spring force will overcome the centrifugal force tending to hold the flyweights in an outward position and thereby allow blade centrifugal twisting moments to decrease the incidence, or pitch, angle thereby tending to cause propeller speed to increase.

Further objects and advantages of the present invention will be apparent from the following description, reference being had to the accompanying drawings wherein a preferred embodiment of the present invention is clearly shown and, wherein similar reference characters denote similar parts throughout the several views.

Figure 3:
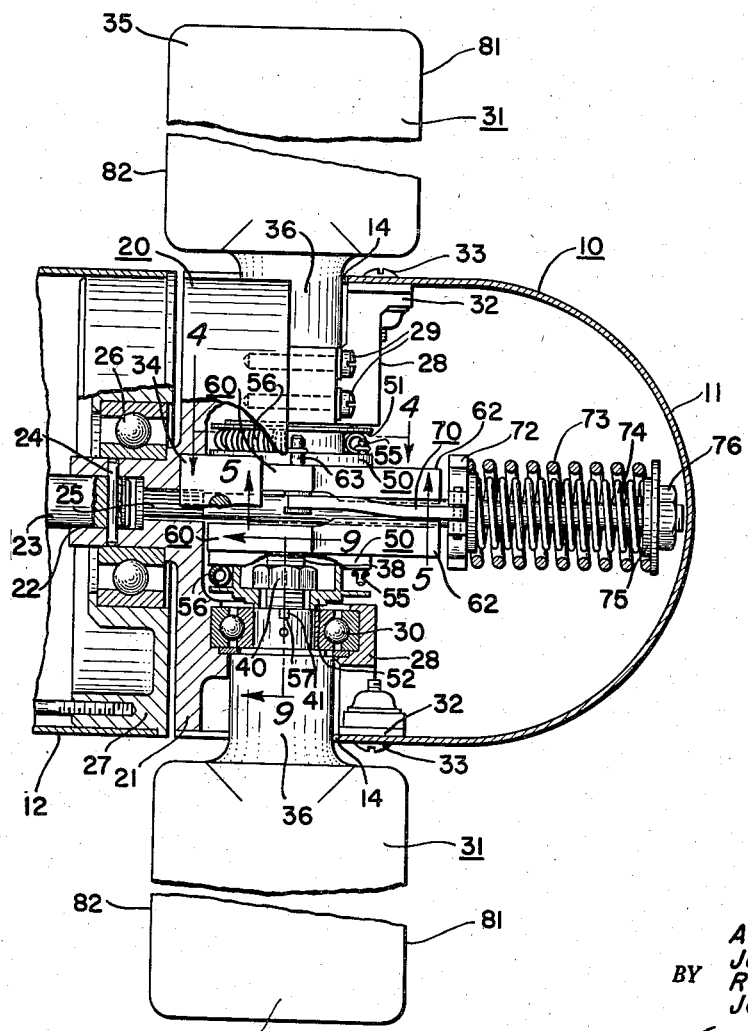
Fig. 3 is an enlarged view, partly in section and partly in elevation, taken generally along the line 3—3 of Fig. 2, with certain parts broken away.

Figs. 4 and 5 are enlarged fragmentary views taken along lines 4—4 and 5—5, respectively, of Fig. 3.

Figs. 6, 7 and 8 are schematic views depicting operation of the mechanical governor of this invention.

Fig. 9 is an enlarged fragmentary view, partly in section and partly in elevation, taken along line 9—9 of Fig. 3.

Figure 1:
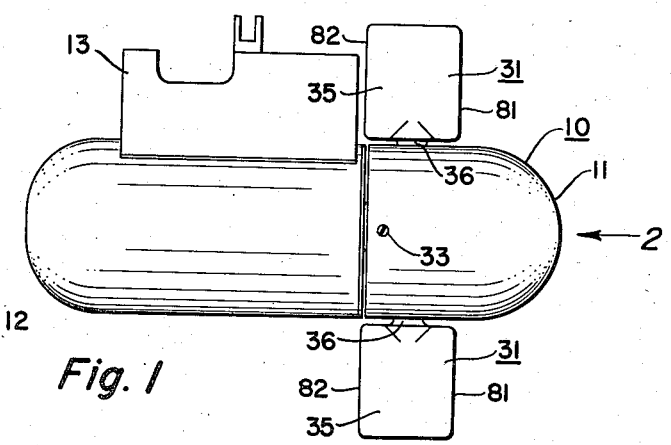
Fig. 1 is a side view, in elevation, of an air driven propeller assembly.
Figure 2:
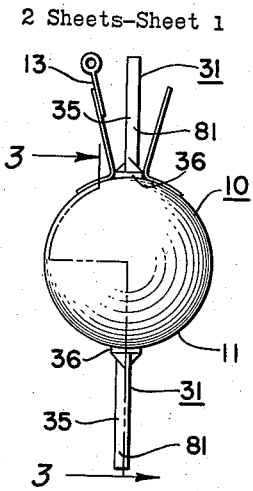
Fig. 2 is a front view, in elevation, taken in the direction of arrow 2 in Fig. 1.

With particular reference to Figs. 1 through 3 of the drawings, an air driven propeller assembly 10 is depicted. As shown in Fig. 1, the assembly comprises a spinner 11, which is attached to and rotatable with the propeller, and a housing 12 within which any suitable accessory, such as a pump or a generator, adapted to be driven by the propeller, is disposed. The housing 12 has attached thereto a bracket assembly 13, by which means the propeller assembly 10 may be supported on an aircraft, either within the aircraft fuselage or in the air stream of the craft. In the present embodiment the accessory comprises a four pole, 400 cycle alternator, the speed of which must be maintained between 11,400 R. P. M. and 12,600 R. P. M. so as to maintain the frequency of alternating current within plus or minus twenty cycles of the design frequency, namely 400 cycles.

With particular reference to Fig. 3, the propeller structure comprises a hub assembly 20, which includes a member 21 having a centrally disposed stepped bore 22 within which a driven shaft 23 is connected by means of a cross pin 24, and within which a shaft extension 25 is rotatably connected and supported by a press fit. The member 21 is rotatably supported by roller bearing means 26, which are carried by a flanged member 27 that is suitably connected to the housing 12. The hub assembly 20 also includes a pair of semi-cylindrical members 28, which are connected to semi-cylindrical portions of the member 21 by bolts 29. The semi-cylindrical portions of member 21 and the members 28 are formed with internal grooves which support the outer races of a ball bearing assembly 30.

The complementary semi-cylindrical members 28 and the semi-cylindrical portions of member 21 form sockets within which propeller blades 31 are supported for rotation about their longitudinal axes by the combined thrust and radial bearing means 30. In addition, each of the members 28 is formed with a bracket portion 32 to which the spinner 11 is attached by screw devices 33. The hub member 21 is formed with a pair of diametrically opposed bracket portions 34, only one being shown in the drawings, to which the spinner shell 11 is also attached. The spinner shell 11 is formed with diametrically opposed cut-out portions 14 through which the blades 31 project.

As shown in Fig. 3, each blade 31 comprises an airfoil section 35 and a root section 36. The root section 36, as shown particularly in Fig. 9, is formed with a central recess 37, within which a threaded stud 38 is retained by a cross pin 39. The threaded portion of the stud 38 is engaged by a nut 40, as shown in Figs. 3 and 9. The roller bearing means 30 have their inner races abutting a portion of the root section 36 so as to rotatably support the blades.

Each stud 38 is encompassed by a generally cup-shaped retaining member 50 having an external annular groove 51 and an annular flange portion 52, which abuts the blade root 36 and is retained in position by the nut 40, which engages a shoulder thereon. The retainer 50 is operatively connected to the blade 31 through the stud and nut assembly 38, 40, which maintains a pair of tangs 57 and 58 within a slot 41 of the blade root. Moreover, as shown in Fig. 4, a portion of the wall, which forms the groove 51, is relieved to form spaced shoulders 53 and 54. The member 50 also carries a pin 55 to which one end of a coiled extension spring 56 is attached.

The stud 38, as is shown particularly in Fig. 9, is also received in an opening 61 of a flyweight 60. Each flyweight 60 includes a weighted arm extension 62 which is arranged to respond to centrifugal force. The stud 38 supports the flyweights 60 for rotation about the axes of the propeller blades 31. Each flyweight carries a pin 63 to which the other ends of the coiled extension springs 56 are attached. As the pins 63 are received in the pace between shoulders 53 and 54, the flyweights can be said to have a lost motion connection with the retainers 50 and the blades 31. When the propeller is stationary, and, hence, is not positioned in the air stream of a moving aircraft, the springs 56 rotate the blades 31 to the position shown in Figs. 1 through 3, as will be described more particularly hereinafter.

The pin 63 of the flyweight 60 is engaged by a pair of connecting rods, or links, 70. As seen particularly in Figs. 4 and 5, the links 70 are formed with bifurcated ends 71 within which the pins 63 are situated. This arrangement facilitates assembly and disassembly of the links 70. The links 70 perform a dual function, namely that of synchronizing movement of the blades about their longitudinal axes, and transmitting a governor spring force to the flyweights 60 so as to oppose outward movement thereof under the urge of centrifugal force. As is seen particularly in Fig. 3, the links 70 are pivotally connected to a collar 72, which is slidably received on the shaft 25. The collar 72 is engaged by a pair of coaxially arranged, preloaded, compression springs 73 and 74, which encompass the shaft extension 25. The springs 73 and 74 also engage a fixed spring guide, or retainer, 75, which is carried by the shaft extension 25 and restrained against movement relative thereto by a nut 76, which threadedly engages the end portion of the shaft 25.

With reference to Figs. 6, 7 and 8, the operation of the governing mechanism and mechanical pitch changing mechanism will be described. Due to the construction of airfoil surfaces, it has been recognized that the blades of a propeller may be subjected to external twisting moments which tend to rotate the blades about their longitudinal axes. In the blades of the instant propeller, the airfoil section is such that the center of pressure does not coincide with the longitudinal axis of the blade as indicated by point 80 in Figs. 5, 6 and 7. As shown, the airfoil section 35 has a leading edge portion 81 and a trailing edge portion 82. The direction of propeller shaft rotation is indicated by the arrow 85 in Figs. 7 and 8, while the direction of flight of the aircraft to which the air driven propeller assembly of this invention is attached, is indicated by the arrow 90. With the particular airfoil section disclosed, the center of pressure is disposed on the trailing edge side of the axis 80, as indicated by arrow 86 in Figs. 7 and 8. Thus, the blades 31 are subjected to aerodynamic twisting moments, approximately proportional to air speed and varying with altitude, which tend to rotate the blades in a counter-clockwise direction, as viewed in Figs. 6, 7 and 8, or in other words, to a high pitch, or incidence, angle. The blades 31 are also subjected to centrifugal twisting moments proportional to propeller R. P. M. and varying with blade angle, which tend to move the blades in a clockwise direction, as viewed in Figs. 7 and 8, or to a low pitch, or incidence, angle. Thus, during propeller rotation, the mass of the airfoil section on each side of the blade axis 80 is subjected to centrifugal force as indicated by arrows 87 and 88, which are the additive torque forces producing the centrifugal twisting moment. The force of governor springs 73 and 74 acting through collar 72 and links 70 positions pins 63 which limit rotation of the blades in a clockwise direction, as viewed in Figs. 7 and 8. However, outward movement of the weighted arms 62 of the flyweights 60 tends to rotate the blades 31 in a counterclockwise direction, as viewed in Figs. 7 and 8. The governor spring force and the mass of the flyweights 60 are chosen so that within a preselected range of rotational speed, for instance, 11,400 R. P. M. to 12,600 R. P. M., the opposing forces acting to alter the pitch, or incidence, angle of the blades 31 at blade angles between 25° and 75° will be in equilibrium. Moreover, the governing mechanism of this invention will function to maintain propeller speed within the preselected range irrespective of variation in either the air stream speed, for example, between 150 and 600 knots or in load on the accessory, by altering the angle of incidence of the blades 31.

The position of the flyweights 60, the links 70, and the blades 31, when the propeller is stationary, is depicted in Figs. 1, 2, 3 and 6. Under these conditions, the propeller assembly would necessarily be located within the aircraft fuselage and not exposed to the moving air stream. At this time, the coiled extension springs 56 will contract and rotate the blades 31 to a high pitch, or incidence, angle, as shown in Fig. 6. This angle, approximately 75°, is chosen so that when the propeller assembly is released into a moving air stream, maximum torque is obtained for rapid starting, and the blades are protected against violent flat plate shock forces. The high angle to which blades 31 may be moved by the springs 56 when the propeller is stationary, is limited by engagement of the pins 63 with the shoulders 54 of the retaining members 50. During rotation of the propeller, high pitch stop means are effected by engagement of pins, or tangs, 77, attached to the retaining members 50 and extending radially therefrom, with the face of member 21, which is located in alignment with the horizontal blade axis. The high pitch stop angle is approximately 75°. Likewise, during rotation of the propeller, low pitch stop means are effected by engagement of the weighted arms 62 of the flyweights 60 with the shaft extension 25 when the pins 63 are in engagement with shoulders 53 of the retaining members 50. The low pitch stop angle is approximately 25°.

When the propeller is released into a moving air stream and the propeller attains sufficient rotational speed, the direction of flight being indicated by arrow 90 in Figs. 7 and 8, the blade centrifugal twisting moments will effect rotation of the blades 31 to an equilibrium blade angle. This blade angle is determined by engagement of pins 63 with shoulders 53 of the retaining members 50. While the springs 56 do not exert any appreciable force opposing movement of the blades toward the low pitch stop angle, they do control the rate of "unfeathering," or movement from the high pitch stop position to the low pitch stop position.

The mechanical governor of this invention is not an isochronous governor. That is, the mechanical governor is not of the type which maintains propeller rotational speed constant at all pitch positions of the propeller. Conversely, the mechanical governor has a linear "droop" characteristic which renders the governor sensitive to blade angle or pitch position. That is, the governor is designed to establish an equilibrium of forces at a 50° blade angle during propeller rotation at 12,000 R. P. M. However, as the blade angle decreases from 50° to 25°, the speed setting of the governor decreases substantially lineally so that at 25°, equilibrium conditions will be effected at 11,400 R. P. M. Conversely, as the pitch position increases from 50° to the high angle position of 75°, the governor speed setting will vary substantially lineally between 12,000 R. P. M. and 12,600 R. P. M. This relationship exists due to the fact that the flyweight governing force is directly proportional to propeller rotational speed and blade angle.

Thus, when the propeller unit is positioned in a moving air stream, the blades 31 will pitch down, or move towards the low pitch stop position, as the rotational speed of the propeller increases. In this manner, the blades will provide maximum torque to effect rapid acceleration of the propeller. When the speed of propeller rotation attains a value, depending upon the air speed and load, within the preselected range, i. e. between 11,400 R. P. M. and 12,600 R. P. M., the opposing forces acting on the blades will be in equilibrium at a particular blade angle between positive 25° and positive 75°. Thus, the particular incidence angle of the blades will remain substantially constant for a given air speed.

However, if the propeller should overspeed, due to a decrease in the load or an increase in air speed, the weighted arms 62 of the flyweight 60 will move outwardly, as shown in Fig. 8, so as to overcome the governor spring force and centrifugal blade twisting moments, and thereby rotate the blades 31 to a higher pitch angle. At this higher pitch angle, a new speed setting, or datum level for the governor will be automatically established, since springs 73 and 74 are further compressed. Thus, the governor will function to maintain a higher rotational speed of the propeller as called for by the higher pitch angle, at which the opposing forces acting on the blades will be in equilibrium. Outward movement of the flyweight 60 is imparted to the blades 31 through the pins 63, which engage the shoulders 53 of the retaining members 50 during rotation of the propeller. Thus, counterclockwise movement of the flyweights 60, as viewed in Fig. 8, will impart counterclockwise movement to the members 50 and, therefore, the blades 31. As propeller pitch is increased, the blades develop a lesser shaft torque and, as a consequence thereof, propeller speed will tend to decrease. However, when the opposing forces acting on the blades are again in equilibrium at the adjusted higher blade angle, and, therefore, at a higher governor speed setting, the incidence angle of the blades will remain substantially constant.

Under these conditions if the propeller should underspeed, due to an increase in the load on the accessory or a decrease in the air speed, the governor spring force and the centrifugal twisting moments will be greater than the flyweight centrifugal force and thereby rotate the blades in a clockwise direction to a lower pitch angle, as viewed in Fig. 8. In this manner, the blades develop greater torque tending to increase propeller speed. However, inasmuch as a change in blade angle effects a change in the datum level or speed setting of the mechanical governor since springs 73 and 74 are extended, the governor will now establish an equilibrium of forces at a lower speed within the preselected speed range. Thus, when the opposing forces acting on the blades are in equilibrium, the adjusted pitch angle of the blades will remain substantially constant at a lower angle.

The mechanical governing mechanism of this invention operates in a manner similar to that disclosed in copending application, Serial No. 420,277, filed of even date herewith, in the name of Gerald E. Hook, et al.

While the embodiment of the present invention as herein disclosed, constitutes a preferred form, it is to be understood that other forms might be adopted.

What is claimed is as follows:

1. An air driven propeller comprising, a hub, a plurality of blades rotatably journaled in said hub for pitch adjustment, a rotatable shaft connected with said hub so as to be driven by said blades, centrifugally responsive means rotatable with said shaft and having operative pin and slot connections with said blades for moving said blades to a high pitch position, resilient means operatively connected with said blades for opposing movement of said centrifugally responsive means, and means connected with said blades for moving said blades to a high pitch position when the propeller is stationary.

2. An air driven propeller including, a hub, a plurality of blades rotatably supported in said hub and operable to rotate said hub when positioned in an air stream, centrifugally responsive means having operative pin and slot connections with said blades and rotatable with said hub for increasing the angle of incidence of the blades, resilient means operatively connected with said blades for opposing an increase in the angle of incidence of said blades, the construction and arrangement being such that at a predetermined rotative speed of the propeller for each angle of incidence, the opposing forces tending to alter the angle of blade incidence will be in equilibrium, and means connected with said blades for moving said blades to a maximum angle of incidence when the propeller is stationary.

3. An air driven propeller including in combination, a hub, a plurality of blades journaled in said hub for pitch adjustment and operable to impart rotation to said hub when positioned in an air stream, mechanical stops operatively engageable with said blades for determining the total angular movement said blades, said blades having root portions and airfoil sections, a cup-shaped member attached to the root portion of each blade, centrifugally responsive means operatively connected with said cup-shaped members for increasing the pitch position of said blades, resilient means operatively connected with said centrifugally responsive means for opposing movement thereof, and means connected with said blades for synchronizing the pitch adjusting movements thereof, the airfoil sections of said blades being subject to centrifugal twisting moments which tend to move the blades to a low pitch position, the construction and arrangement being such that propeller speed is maintained within a preselected range in air streams of widely varying velocities by pitch adjustment of said blades due to the opposing forces acting thereon.

4. An air driven propeller including in combination, a hub, a plurality of blades rotatably journaled in said hub for pitch adjustment and operable to impart rotation to said hub when positioned in an air stream, said blades being subject to centrifugal twisting moments which tend to move the blades to a low pitch position, centrifugally responsive means rotatable with said hub and having operative pin and slot connections with said blades for effecting movement thereof to a high pitch position, and resilient means operatively connected with said blades for opposing the movement of said centrifugally responsive means and establishing an equilibrium between the opposing forces tending to vary the pitch position of said blades within a preselected range of propeller speeds.

5. An air driven propeller including in combination, a hub, a plurality of blades rotatably journaled in said hub for pitch adjustment and operable to impart rotation to said hub when positioned in an air stream, said blades being subject to centrifugal twisting moments which produce a force tending to move the blades to a low pitch position, centrifugally responsive means rotatable with the hub and connected with said blades for producing a force tending to move the blades to a high pitch position, and resilient means operatively connected with said centrifugally responsive means for opposing movement thereof, the operative connection between said resilient means and said centrifugally responsive means comprising a pair of links which function to synchronize the pitch adjusting movements of said blades, the construction and arrangement being such that the opposing forces tending to vary the pitch position of said blades will be in equilibrium within a preselected range of propeller speeds.

6. An air driven propeller including in combination, a hub, a plurality of blades rotatably journaled in said hub for pitch adjustment and operable to impart rotation to said hub when positioned in an air stream, a rotatable shaft connected with said hub so as to be driven thereby, said blades, being subject to centrifugal twisting moments which produce a force tending to move the blades to a low pitch position, a centrifugally responsive flyweight operatively connected with each blade for producing a force tending to move the blades to a high pitch position during propeller rotation, a spring assembly supported by said shaft including a collar slidably received on said shaft, and a pair of links operatively interconnecting said collar and said flyweights for opposing outward movement thereof under the urge of centrifugal force, the construction and arrangement being such that at a preselected speed of propeller rotation for each pitch position of said blades, the opposing forces tending to vary the pitch position of said blades will be in equilibrium.

7. An air driven propeller including in combination, a hub, a plurality of blades rotatably journaled in said hub for pitch adjustment and operable to impart rotation to said hub when positioned in an air stream, said blades being subject to centrifugal twisting moments during propeller rotation which produces a force tending to move the blades to a low pitch position, centrifugally responsive means rotatable with said hub and operatively connected with said blades for producing a force tending to move the blades to a high pitch position, stop means for determining the maximum high and the minimum low pitch positions of said blades, resilient means operatively connected with said blades for opposing movement thereof to a high pitch position, the construction and arrangement being such that at a preselected speed of propeller rotation for each pitch position of said blades between said high and low pitch stop positions, the opposing forces tending to vary the pitch of said blades will be in equilibrium, and means connected with said blades for moving said blades to a high pitch position when the propeller is stationary.

8. An air driven propeller including in combination, a hub, a pair of blades rotatably journaled in said hub for pitch adjustment and operable to impart rotation thereto when positioned in an air stream, a cup-shaped member operatively connected to each blade, each cup-shaped member having an annular groove, a coiled extension spring within the groove of each cup-shaped member, one end of each spring being connected to a pin carried by said cup-shaped member, a pair of flyweights rotatably supported in said hub, each flyweight having a pin to which the other ends of the coiled extension springs are attached, said cup-shaped members presenting a pair of shoulders for engagement with said weight carried pins constituting a lost motion between said flyweights and said cup-shaped members, whereby movement of said weights in response to centrifugal force will impart rotation to said cup-shaped members so as to increase the pitch position of said blades, and resilient means operatively connected with said flyweights for opposing movement thereof in response to propeller rotation.

9. An air driven propeller including in combination, a hub, a plurality of blades journalled in said hub for pitch adjustment and operable to impart rotation to said hub when positioned in an air stream, said blades having root portions and airfoil sections, a cup-shaped member attached to the root portion of each blade having a slot with spaced shoulders, centrifugally responsive means operatively connected with said cup-shaped members for increasing the pitch position of said blades, the operative connection between said centrifugally responsive means and said cup-shaped members comprising pins carried by the centrifugally responsive means and engageable with the spaced shoulders on the cup-shaped members, resilient means operatively connected with said centrifugally responsive means for opposing movement thereof, and means connected with the blades for synchronizing the pitch adjusting movements thereof, the airfoil sections of said blades being subject to centrifugal twisting moments which tend to move the blades to a low pitch position, the construction and arrangement being such that propeller speed is maintained within a preselected range in air streams of widely varying velocity by a pitch adjustment of said blades due to the opposing force acting thereon.

References Cited in the file of this patent
UNITED STATES PATENTS

| | | |
|---|---|---|
| 1,287,116 | Schramm | Dec. 10, 1918 |
| 1,401,651 | Scharnagel | Dec. 27, 1921 |
| 1,443,664 | Vischer | Jan. 30, 1923 |
| 1,636,434 | Pinaud | July 19, 1927 |
| 1,768,784 | Pinaud | July 1, 1930 |
| 2,215,413 | Weeks | Sept. 17, 1940 |
| 2,550,229 | Cotton | Apr. 24, 1951 |